J. F. STEWARD
GRAIN BINDER.

No. 266,913.                              Patented Oct. 31, 1882.

Witnesses:
Hiram Whitney
P. F. Hodges

Inventor:
John F. Steward

J. F. STEWARD.
GRAIN BINDER.

No. 266,913. Patented Oct. 31, 1882.

Witnesses:
Hiram Whitney
P. F. Hodges

Inventor:
John F. Steward

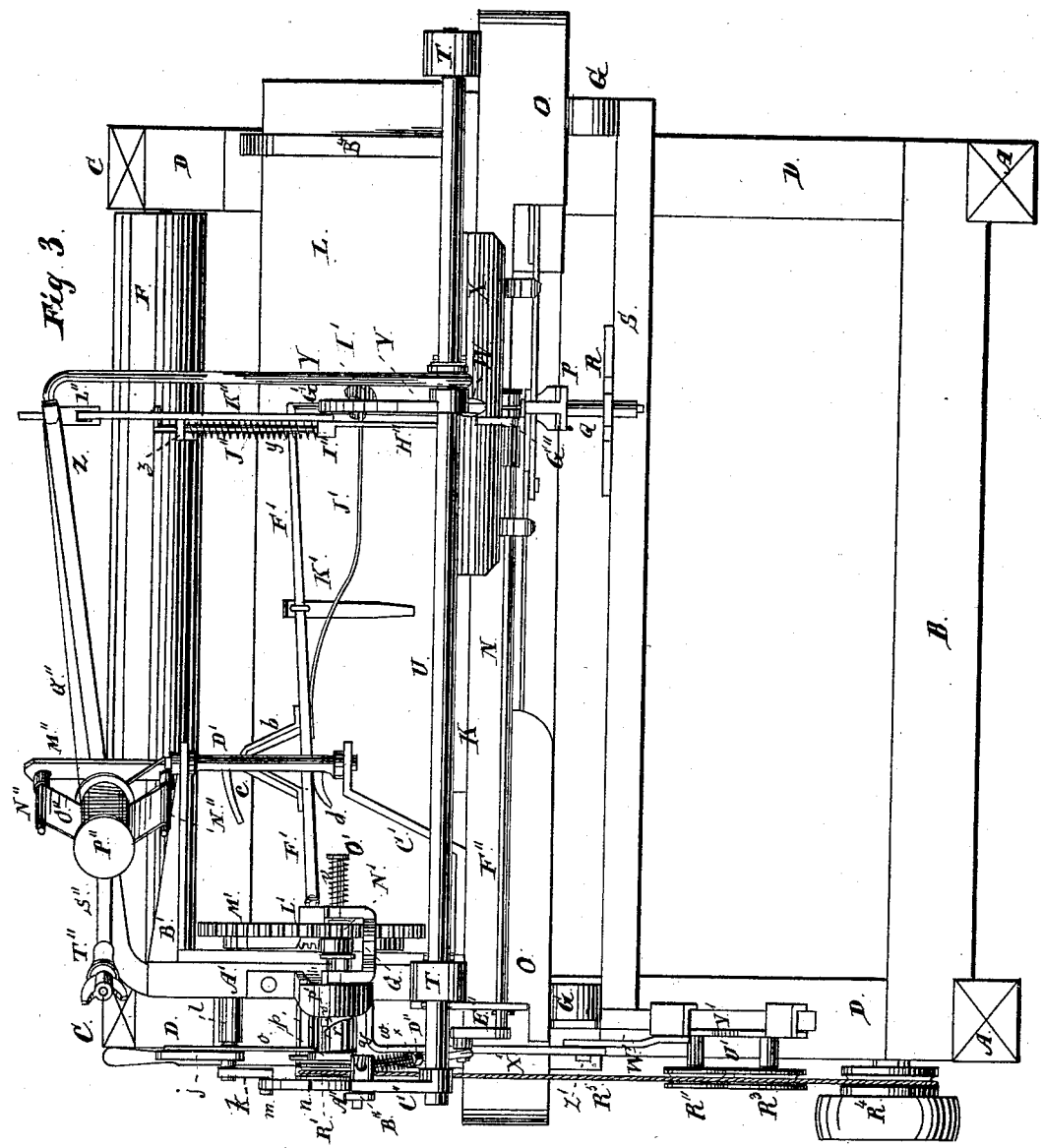

J. F. STEWARD.
GRAIN BINDER.
No. 266,913.
7 Sheets—Sheet 4.
Patented Oct. 31, 1882.
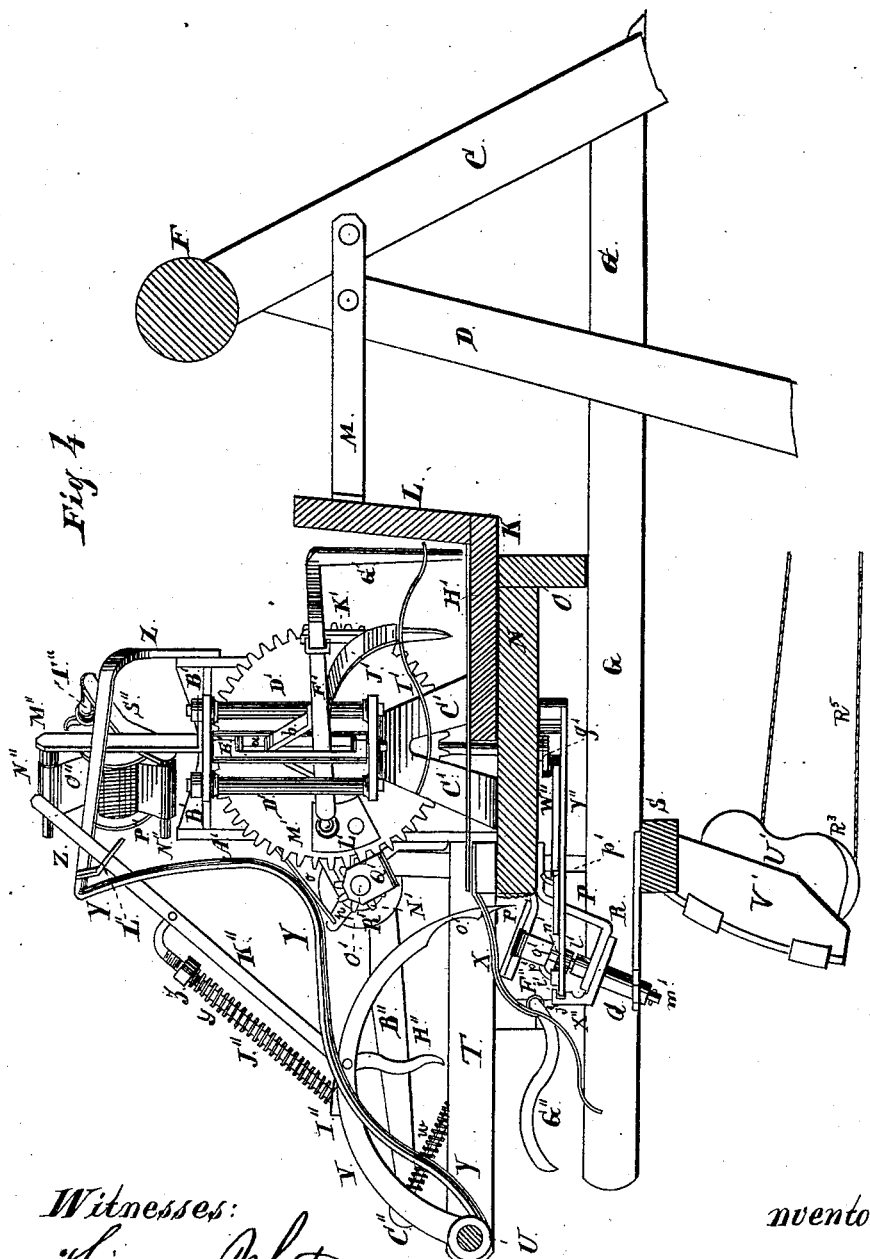

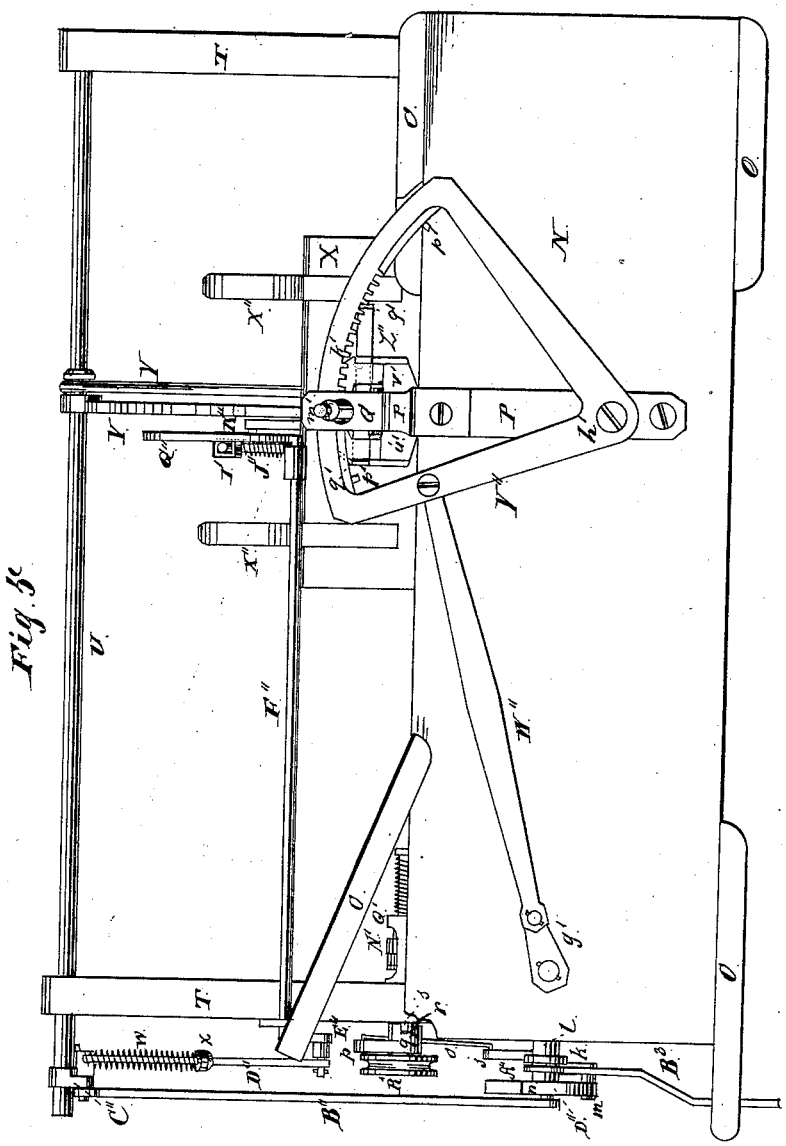

J. F. STEWARD.
GRAIN BINDER.
No. 266,913. Patented Oct. 31, 1882.
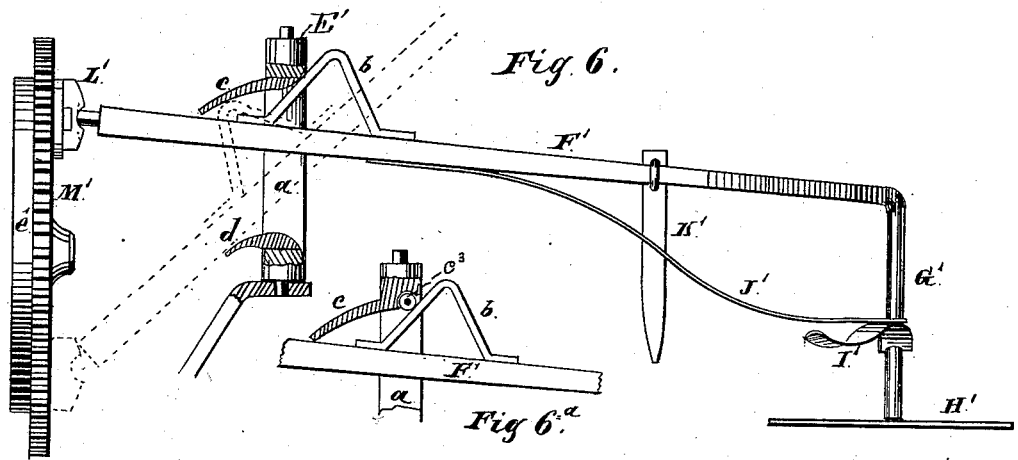
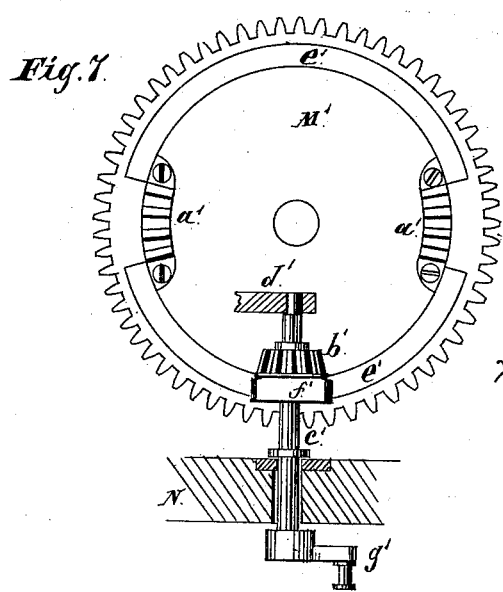
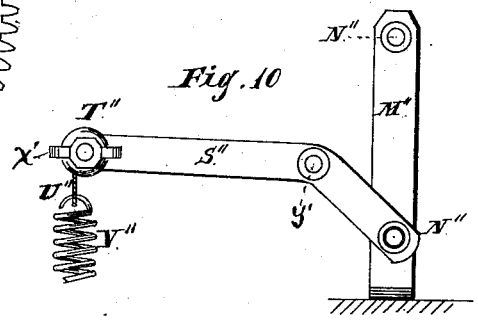
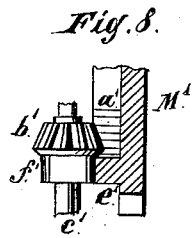
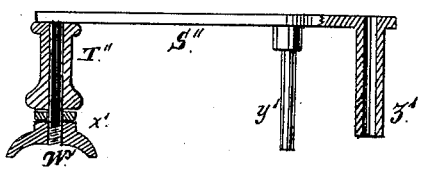
Witnesses:
Inventor.

J. F. STEWARD.
GRAIN BINDER.
No. 266,913.
7 Sheets—Sheet 7.
Patented Oct. 31, 1882.
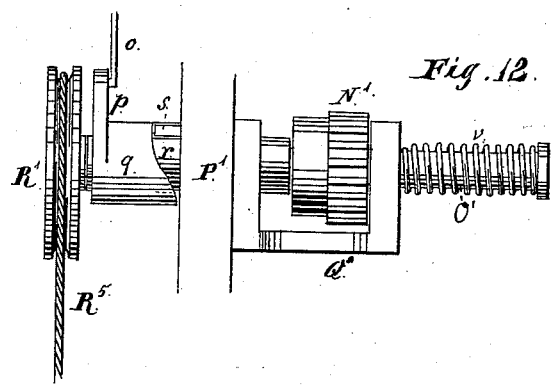
Fig. 12.
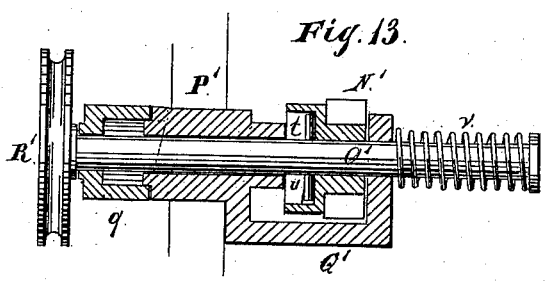
Fig. 13.
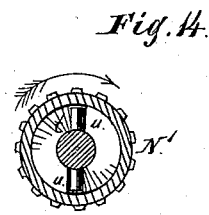
Fig. 14.
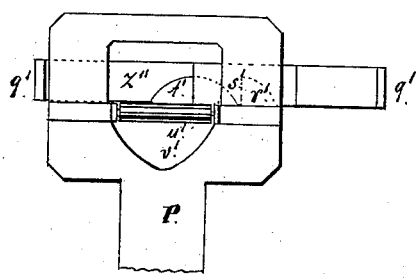
Fig. 15.
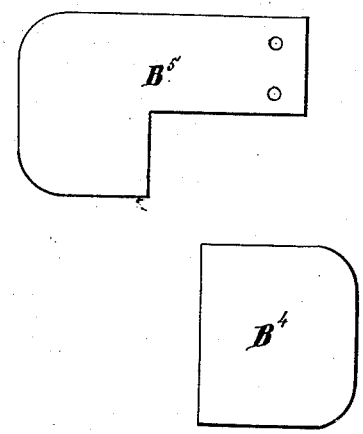
Witnesses:
Hiram Whitney
P. F. Hodges
Inventor:
John F. Steward

UNITED STATES PATENT OFFICE.

JOHN F. STEWARD, OF PLANO, ASSIGNOR TO ELIJAH H. GAMMON AND WILLIAM DEERING, OF CHICAGO, ILLINOIS.

GRAIN-BINDER.

SPECIFICATION forming part of Letters Patent No. 266,913, dated October 31, 1882.

Application filed August 16, 1878.

*To all whom it may concern:*

Be it known that I, JOHN F. STEWARD, of Plano, Kendall county, State of Illinois, have invented new and useful Improvements in Grain-Binders, of which the following is a full description, reference being had to the accompanying drawings, in which—

Figure 1:
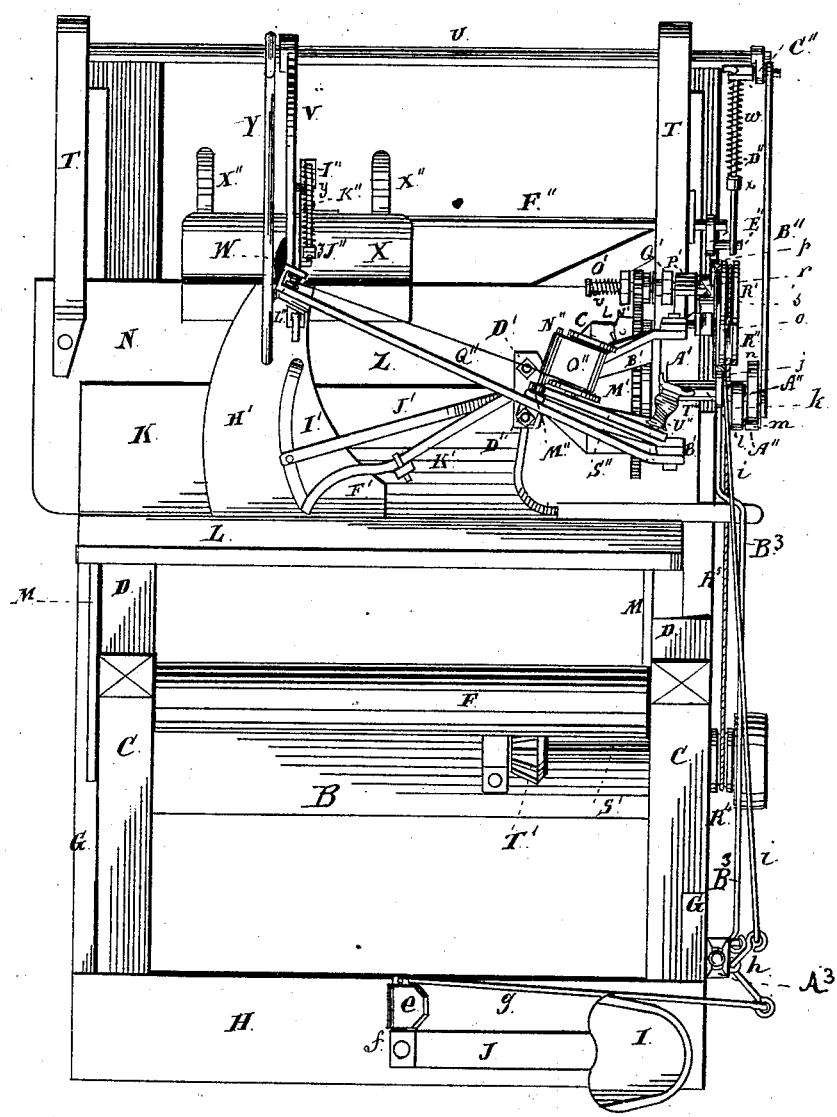
Figure 2:
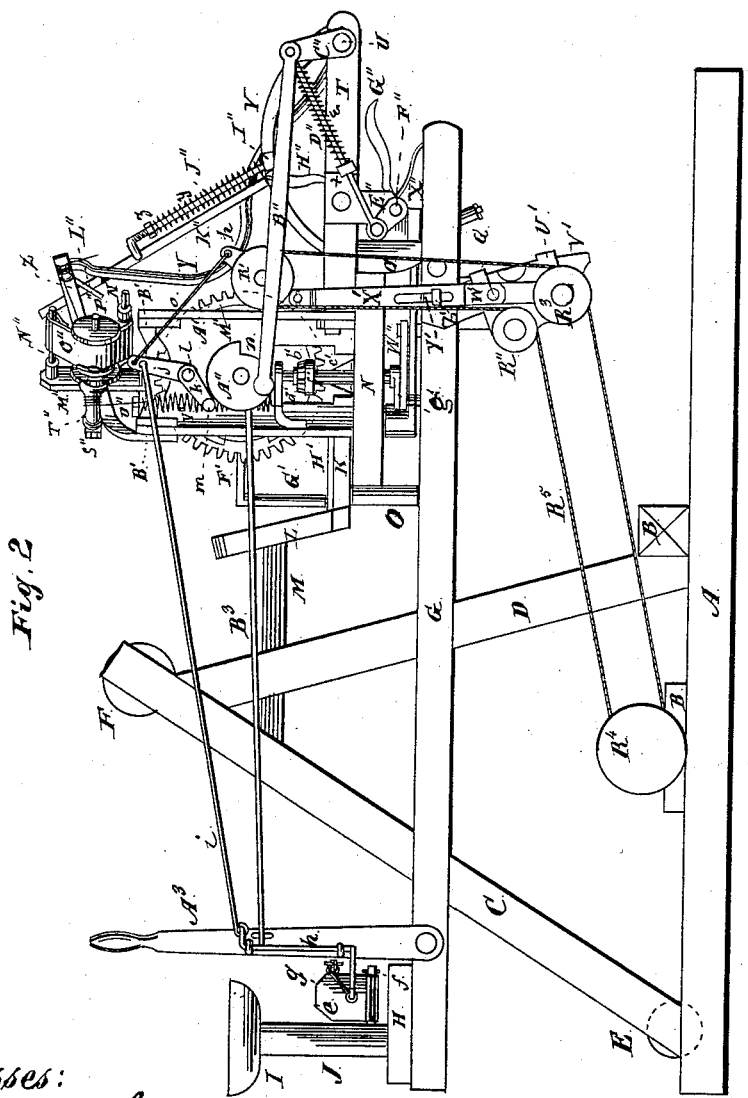

Figure 1 is a top or plan view; Fig. 2, a rear end elevation; Fig. 3, a side elevation; Fig. 4, a cross-section; Fig. 5, a bottom view of the pivoted table and its attached devices; Figs. 6 and 6ª, detail views, on an enlarged scale, of the rake-arm and its attachments; Figs. 7 and 8, enlarged details of the mechanism for operating the sector-frame which actuates the twisting devices; Figs. 9, 10, and 11, details of the devices for supporting the wire-spool; Figs. 12, 13, and 14, details of the devices for stopping the movement of the binding mechanism; Fig. 15, an inverted plan view, showing a detail of the wire-cutter.

This invention relates to automatic grain-binders; and its objects are to improve the construction and operation of the rake or arm which carries the grain to the binding mechanism, the devices for compressing the bundle for binding, the devices for severing the wire and operating the twisting and cutting devices, the manner of supporting the wire-spool, and generally the construction and operation of the binding mechanism. These objects I attain by the construction and arrangement of mechanism illustrated in the accompanying drawings, which I will now proceed to describe in detail, afterward pointing out my invention in the appended claims.

The machine represented in the drawings belongs to that class in which the grain is elevated over the main or drive wheel and delivered to the binder for binding.

The parts indicated by the letters A B C D E F G H I J may be of any of the well-known forms of construction for such parts in machines of this class.

The completed machine is to be provided with the ordinary appliances—such as carrier-platform, elevator, sickle, grain-wheel, divider, &c.—used in machines of this description; but as such appliances are constructed, located, and operate in the usual manner they are neither shown nor described.

The receiving-table K is so located as to receive the grain from the upper elevator-roller, F, and, as shown, is provided with a back board, L, to which is secured one end of the bars or supports M, the other ends of which are secured in any suitable manner to the elevator-frame C D, as shown in Fig. 4, by which means the table is supported in its position. Beneath this table K is located the table N, which supports the binding mechanism, and which, as shown, is provided with legs or supports O, which rest upon the bars G and keep the table in a level position. To the under side of this table N is secured a metal bar, P, consisting of an upper and lower portion, as shown in Fig. 4. To the lower portion is secured the upper end of an inclined metal socket, Q, the bar being bent to give the desired inclination and the end of the socket projecting slightly above its support. The lower end of this socket passes through a suitable opening in the outer end of a metal plate or support, R, the inner end of which is secured to a cross-bar, S, in any suitable manner, the cross-bar being secured to the under side of the bars G. This socket not only forms a pivot for the table N, but also forms a bearing for the twisting device, the shaft $m'$ of which passes through the socket, and is held in place by means of a pin or other suitable device. In order to bring the twisting device into proper position to grasp the binding-wire, the socket is inclined, as shown.

By making the socket Q serve both as a pivot for the table and a bearing for the twisting device, no matter in what position the table may be swung the twister will always be operative, because the point where the twisting is performed remains stationary, the location being at the center of the pivotal point of the table. The table is swung on the pivot or socket Q by the hand-lever $A^3$, connected with the binding mechanism by the rod $B^3$, secured to the bearing for the shaft of the wheel M', as shown, or secured to some other portion of the rake-carrying frame A'. By swinging said table N on its pivot the binding mechanism can be adjusted to bind grain of different lengths at or near the center, irrespective of the delivery of the grain onto the receiving-table.

The shaft U has its bearings in the outer ends of the bars T, which are secured, as shown, to the upper side of the swinging table N. To this shaft U is secured the binder-arm V, the location on the shaft being such as to bring the arm in line with the twisting device and the pivotal point of the table N, so that the descent of the binder-arm will be the same, irrespective of the position of the table N, and thereby bring the binding-wire, which passes through the opening in the point thereof, in position to be acted upon by the twisting device. A suitable opening, W, is provided in the plate X for the passage of the binder-arm V for this purpose. This plate X is secured at one edge to the top of the table N, and is bent or curved so as to form a suitable device for supporting the bundle while being bound, and to serve as a guard for the binding devices. To its outer edge, as shown, are secured arms X'', which form supports and guides for the bundle when being discharged, the object being to carry the bound bundle a sufficient distance from the binding devices to insure its proper discharge.

The brace rod or bar Y is supported at its lower end on the shaft U, and is bent or curved, so as to extend up and over the binding-table, to form a support for the outer end of the bar Z, secured thereto, the inner end of which bar is secured in any suitable manner to the frame A'. This bar Z serves as a wire leader or guide, the binding-wire passing from the spool over an anti-friction pulley located in the outer end of the bar.

On the rear end of the table N is secured in any suitable manner a frame, A', which frame may be constructed in the form shown, or in any other form suitable for the purpose of supporting the wheel which operates the rake-arm and binding devices. The rock-shaft E', which supports the rake-arm, has its bearings in suitable heads on the outer ends of the arms B' C', secured to the top and bottom of the frame A', the heads being connected together by means of suitable tie-rods or braces, D', one on each side of the rock-shaft. In this rock-shaft E' is a long vertical slot $a$, at the lower end of which is secured a curved piece of metal, $d$, which projects to the rear of the shaft, as shown in Fig. 6, and at its upper end is secured a curved piece of metal, $c$, also projecting to the rear of the shaft. In the slot $a$ is located the rake-arm F', the forward end of which is provided with a suitable tooth or arm, G', to engage the grain, and its rear end is held in a suitable socket, L', secured to the face of the wheel M', so that the revolving of the wheel will give the required vertical and horizontal movements to the rake-arm; but the arm will be given a high vertical movement because the under side will come in contact with the upper face of the curved projection $d$, which will act as a variable fulcrum for the arm, and the result will be that the front end of the arm will be raised to a higher altitude than if this elongated fulcrum $d$ were not provided, thereby lifting the rake-arm so that its tooth on the return movement will not come in contact with the grain which has accumulated on the table K. On the upper face of this rake-arm F' is a projection $b$, formed so as to have a front and rear inclined face, the upper end of which is rounded, which projection is so located on the rake-arm that its upper end and rear inclined face will come in contact with the under face of the projection $c$ during the upward movement of the rake-arm, and will remain in contact until the arm has passed over and back of the accumulated grain on the receiving-table K, and the grain for a bundle has been separated from the falling grain by the tooth G', and is ready to be carried toward the binding mechanism, at which time the rear face of the incline $b$ will come in contact with the end of the slot $a$, or with an anti-friction wheel, $c^3$, located therein, so that the arm will be held firmly down while sweeping across the receiving-table, carrying the grain to the binding mechanism. The metal plate H' is secured to the top of the table beneath the tooth G', to prevent the tooth from wearing a hole in the table.

The grain for the bundle is held while being swept across the receiving-table by the holder I', bent or curved to receive the grain beneath it, and provided with an opening through which the tooth G' passes, so that the holder can move up and down on the tooth. The holder is supported by the spring J', to one end of which it is permanently secured, and which extends back and is secured to the rake-arm just forward of the rock-shaft E', so that the holder is free to adapt itself to any desirable quantity of grain.

On the arm F', between the tooth G' and rock-shaft E', is secured a tooth, K', the location being such as to cause it to engage with the heads of the grain, and to hold them so that they will move with the arm and not lag behind, as would naturally be the case, the heads being the lightest and the sweep of the arm being in the arc of a circle. The tooth or spur K' prevents any lagging behind of the heads and delivers the grain to the binding mechanism in proper position for binding.

The wheel M' is driven by means of a pinion, N', supported upon a shaft, O', having its bearing in the support P', secured to the frame A' and the yoke Q', between the arms of which the pinion N' is located, which yoke may be formed with the support P', or be made separate and attached thereto. The shaft O' slides back and forth in its bearing. The engagement between this shaft and the pinion N' is effected by means of a pin, $t$, on the shaft, which engages with shoulders $u$, having inclined faces formed in the hub of the pinion N', which are held in engagement by the coil-spring $v$, located on the shaft O', between the yoke Q' and a collar or pin on the end of the shaft. The other end of the sliding shaft O' carries a crank, p, having a head or sleeve, q, turning loosely on said shaft, on which sleeve is an incline, r, the face of which comes in contact with the projection s on the side of the bracket or support P', as shown in Figs. 3 and 12, so that as the head q is turned the shaft O' will be withdrawn, disengaging the pin t from the shoulders u, and stopping the revolution of the pinion, and consequently that of the wheel M' and the binding mechanism.

To the end of the crank p is secured one end of a link or rod, o, the other end of which is secured to one arm, j, of a bell-crank lever, the head or pivot of which turns in a socket or support, l, secured to the frame A' above the socket or bearing for the shaft of the main wheel M'. The other arm, k, of the bell-crank lever is provided with an anti-friction roller, m, so arranged as to come in contact with the face of a wheel or disk, A'', which is secured to the end of the shaft which supports the wheel M'. The face of the disk A'' is not a perfect circle, but has a portion cut away so as to leave a depression or notch, n, into which the roller m can drop.

To the arm j is secured one end of a rod, i, the other end of which rod is secured to the upper arm or crank of the vertical rock-shaft h, supported in suitable bearings on the lever $A^3$. The lower arm of the rock-shaft h is secured to one end of a rod or link, g, the other end of which is secured near the upper end of the treadle e, which treadle is pivoted to the support f, secured at the foot of the seat-support J, so that the driver can place his foot on the treadle whenever desired.

The disk or wheel A'' is so arranged relative to the movements of the rake-arm F that when the rake-arm has completed its sweeping movement across the plate H' the depression n in the disk A'' will be in the proper position to allow the anti-friction roller m to drop therein, and withdraw the shaft O' from its engagement with the pinion N' and stop the movement of the rake-arm. To accomplish this result the driver depresses the treadle e, which, through the rod or link g, turns the rock-shaft h and draws the rod i toward the driver, which turns the bell-crank lever in its socket or support l, throwing the arm k down and forcing the roller m into the depression n. This falling of the arm k causes the other arm, j, through the rod or link o and crank p, to turn the head q on the shaft O', bringing the incline r in contact with the pin or projection s, which acts to slide the shaft O' in its bearing and withdraw the pin t from contact with the shoulder u, thereby stopping the movement of the pinion N', and consequently the binding mechanism. The shoulder of the notch n, coming in contact with the roller m on the arm k, prevents the accidental movement of the wheel M', and consequently the raking and binding mechanism. By means of this notched disk A'' and the described co-operating devices the driver can easily stop the movement of the mechanism for the purpose of allowing enough grain to accumulate on the table for another bundle, or for any other purpose, and such stoppage does not depend upon any automatic devices which act whether a stoppage is necessary or not, so that the operator has full control of the binding mechanism, and no matter in what position the table N may be the devices for withdrawing the sliding shaft will always be operative, because the rock-shaft h is supported and operates on the lever $A^3$, so that in whatever position the lever may be placed the shaft h will be in a corresponding position.

Near the outer edge of and below the table N is located the shaft F'', the bearings of which are secured to the plate X and the supporting-bar T. To the shaft F'' is secured an arm or lever, G'', curved as shown in Figs. 2 and 4, the location of which in relation to the wire-carrying arm V is such that it will move in a line with and near to the wire-arm, and its pivot is so located in relation to the delivery of the grain as to bring it below the point of binding, the object being to have the arm act as a compressor in connection with the wire-arm to compress the bundle and relieve the binding-wire from strain. For this purpose the movements of the arm G'' and the wire-arm V are directly opposite to each other—that is, when the wire-carrying arm descends the arm G'' will ascend, and vice versa. Movement is given to the compressor-arm G'' by the crank E'', secured to the end of the shaft F'', to which crank one end of the rod D'' is secured, the other end of which rod passes through a head or a stud secured to the end of the crank C'', which crank is permanently secured to the end of the shaft U, and is operated by means of the bar B'' from the wheel or disk A'', the arrangement of the cranks C'' E'' relative to each other and the arms G'' and V being such as to give the desired movements to said arms. In order that the movement of the compressor-arm G'' may be such as to adapt it to bundles of varying sizes, the rod D'', which operates the crank E'', is allowed to slip in its socket, by which it is connected with the crank C'', the connection being made yielding by means of a coiled spring, w, one end of which is in contact with a collar, X, on the rod D'' and the other with the stud or socket on the crank C''. This spring is strong enough to operate the crank E'', and yet allow the rod D'' to slide through the head or socket when the arm G'' has completed the compression of the bundle, so that no injury can result if the crank C'' continues its movement after the arm G'' has compressed the bundle. The spring w readjusts the parts on the return movement of the crank C''.

Another form of compressor is provided by means of the arm or lever H'', pivoted directly to the wire-arm V, as shown in Fig. 4, which acts in conjunction with the wire-arm to compress the bundle, the movement of the wire-arm operating the arm H''. This arm H'' is provided with a head or socket, l'', at its upper end, in which is located one end of the bar J'', the other end of which is secured to a sliding bar, K''. The lower end of the bar K'' is pivoted to the same pivot by which the arm H'' is secured to the wire-arm, and its upper end passes through a suitable slot in the support L'', rigidly secured to the stationary arm Z, near its outer end, as shown in Figs. 2, 3, and 4. The reciprocating movement of the wire-arm will operate the compressor arm or lever H'', for as the wire-arm moves up and down it will slide the bar K'' back and forth in its support L'', which movement of the bar K'' will, through the rod J'' and head l'', operate the arm H''. In order that the arm H'' may adapt itself to bundles of varying sizes, the connection between the sliding bar K'' and the arm H'' is made yielding by means of the spring $y$, coiled around the rod J'', one end of which rests against a set-nut, $z$, on the rod, and the other against the head l'' on the arm H'', so that the rod is free to slide in its socket in l'' when the arm H'' has compressed the bundle.

It is not designed to use both the compressor-arms G'' and H'' on the same machine, although it may be found desirable in some cases to have both attached. Generally only one form of compressor will be used.

In operation, in both styles of compressor, the bundle will be compressed between the under face of the wire-arm and the compressor, the compressor G'' having a pivotal point and operating independent of the wire-arm, and yet working in unison therewith, and the compressor H'' having its pivotal point directly on the wire-arm and operating therewith.

To the head of the bars B' is secured a standard, M'', near the top and bottom of which are secured spindles or pins N'', to which is secured a piece, O'', of leather or other suitable material, forming a backing, which acts as a tension-pad for the wire to prevent unwinding too rapidly.

The wire-spool P'' is supported upon a spindle, $y'$, rigidly secured to the lever S'', which lever is formed as represented in Fig. 10, and is pivoted by means of the socket or long bearing $z'$ to the lower spindle or pin, N'', so that the lever S'' is free to move up and down. The other end of this lever S'' is provided with a small spool or roller, T'', mounted on the spindle $w'$, rigidly fastened to the lever, and held in place thereon by means of the thumb-nut $x'$, by means of which the roller T'' can be tightened so as to prevent its revolving on its spindle $w'$. To this roller T'' is secured one end of a cord, U'', the other end of which is secured to a coiled spring, V'', the lower end of the spring being secured, as shown, to the support $d'$; but it may be secured, if desired, to some other portion of the frame A'. The spool is supported on the lever S'' in such a manner that any undue tension—such as that caused by a knot in the wire or other obstruction—which would interfere with the proper unwinding of the wire by coming in contact with the backing or pad O'' or other cause will be released, because the yielding lever S'' will admit of the spool being drawn away from the pad by the action of the wire, thereby releasing the wire. The amount of yield is regulated, as shown, by the cord U'' and spring V'', the cord being wound on the roller T'' according to the amount of yield desired. The spring acts to draw the lever down after the obstruction has passed, so as to bring the wire again in contact with the tension-pad. The weight of the spool and the wire carried by it also acts to bring the wire in contact with the pad, so that the device acts as a self-regulating tension under all circumstances.

On the rear face of the wheel M', directly opposite each other, are secured two cog-segments, $a'$, so arranged as to engage with the pinion $b'$, which is secured to the shaft $c'$, the bearings for the upper end of the shaft being in the support $d'$, secured to the frame A', and for the lower end in the plate secured to the table N. On this rear face of the wheel M' are flanges $e'$, which do not extend the entire distance around the wheel, but only from segment to segment $a'$. These flanges engage with the flat faces $f'$, formed on the hub of the pinion $b'$. (See Fig. 7.) By means of the cogged segments motion will be given to the pinion $b'$; but such motion will be stopped when a face $f'$ is engaged with one of the flanges $e'$.

To the lower end of the shaft $c'$, which projects below the table N, is secured a crank, $g'$, to which is pivoted one end of the bar W'', the other end of which is pivoted to the frame Y'', as shown in Fig. 5, which frame is pivoted at $h'$ to the plate or support P. This frame Y'' is of a sector shape, the center being at the pivot $h'$, and has a corresponding-shaped opening in its center. The outer edge of the frame is held in position by and moves in the groove $i'$ in the head $j'$, which head is suitably secured to the lower portion of the bar or plate P. (See Fig. 4.) On the inner face, at the center of the perimeter of the sector, is a rack, $k'$, so arranged as to engage with the pinion $l'$ on the shaft $m'$ of the twister, which shaft has its bearings in the socket Q, as before described, and may be of any suitable construction. As shown, it belongs to that class of twisters in which the main wire is coiled around the shank of the hook or twister. Above the pinion $l'$ is a collar, $n'$, having flat faces which come in contact with suitable flanges located on the sector-frame Y'', one at each side of the cogged segment, and prevent the revolution of the twister while the cutting is being performed.

The cutting-blade Z'' is supported in a suitable head located on the upper portion of the bar P, and slides back and forth therein. This cutter consists of a single straight bar having an opening, $r'$, one edge of which is straight and the other curved, the straight edge being provided with a cutting-edge, $s'$, to sever the binding-wire, and a curved opening, $t'$, in which the binding-wire can swing while the twister is making its forward revolution, and for the passage of the wire-arm V to bring the wire within reach of the twister. On each end of this sliding shear or cutter $Z''$ is a downward lip or projection, $q'$, with which suitable projections, $p'$, on the sector-frame $Y''$, come in contact, so that as the frame is carried forward and back these projections will alternately strike the engaging points $q'$ or the ends of the cutter and move the cutter back and forth in its guideways. The mechanism for twisting and cutting is located beneath the plate X. The plate P, which supports the sliding shear-blade, is provided with an opening, $v'$, located below the opening W in the plate X, for the passage of the needle or wire-arm V. In order to prevent the binding-wire from being carried too far down, a roller, $u'$, is so located as to cause the wire to be taken therefrom in such manner that it will be wound on the shank of the twister. This roller is supported in suitable bearings secured to the upper portion of the plate P. The twister and cutter are thus both operated by devices secured to the same oscillating frame, and a simple and effective mechanism is provided for effecting the twisting and cutting.

In operation the binding-wire $Q''$ is carried around the bundle, which is compressed, as before described, and supported on the plate X. The wire-arm V passes over the bundle through the openings provided for it until the notch or opening $o'$ therein is opposite the point of the twister, allowing the twisting device to revolve and engage the wire. At this time one of the segments $a'$ will come in contact with the pinion $b'$ and revolve it with its shaft $c'$, causing the crank $g'$, through the bar $W''$, to swing the sector-frame $Y''$ on its pivot, bringing the rack $k'$ in engagement with the pinion $l'$ of the twisting device, thus rotating the latter and twisting the strands of the wire together, as usual. This movement will continue until the rack has passed its entire length over the pinion $l'$, when the projection $p'$ will strike the end of the cutting shear-blade $Z''$, forcing the cutting-edge $s'$ thereof against the binding-wire and severing the same. At this time the segment $a'$ has passed from its engagement with the pinion $b'$, and the flange $e'$ has come in contact with the face $f'$, stopping the revolution of the crank $c'$ and the swinging of the sector-frame $Y''$, and consequently the operation of the twisting mechanism. The wheel $A''$ will then be in position to act upon the shaft U through the bar $B''$ and crank $C''$ and cause the wire-arm to ascend. At the same time the compressor-arm $G''$ or $H''$ will be withdrawn, as before described, allowing the bundle which has been bound to be discharged. The rake-arm has now been raised and carried over back of the grain, and is carrying another bundle forward to the twisting mechanism. During this movement the other segment $a'$ will come in contact with the pinion $b'$, operating the shaft $c'$, and through the crank $g'$ and bar $W''$ return the swinging sector-frame, bringing the rack $k'$ again in contact with the pinion $l'$, thus reversing the movement of the twister. The opening $t'$ in the blade $Z''$ allows the binding-wire to swing free during such reverse movement, causing the projection $p'$ to strike the other end, $q'$, of the cutting-blade, and returning the parts to the proper position to again twist and sever the binding-wire for the next bundle, which is bound and discharged as before described. These movements will continue, the wire for each bundle being drawn from the spool by the movement of the wire-arm, as usual.

Motion is given to the shaft $O'$ by the cord or chain $R^5$, which passes from a suitable pulley, $R^4$, on the end of the shaft $S'$ over the series of pulleys $R^3$ $R''$ $R'$. The shaft $S'$ has its bearings in suitable supports on one of the cross-pieces B of the main frame, and is driven by means of a pinion, $T'$, so located and arranged as to be driven from the main drive-wheel. In order to take up any slack in the chain or rope $R^5$ the pulleys $R''$ $R^3$ have their bearings on a sliding plate, $U'$, which is supported on a curved metal bar, $V'$, the upper end of which is secured to one of the supporting-bars T.

To the upper end of the sliding plate $U'$ is secured one end of a short bar or strap, $W'$, the upper end of which is provided with a set screw or bolt, $Z'$, which passes through a slot, $Y'$, in the lower end of a bar or strap, $X'$, the upper end of which is pivoted to a pin or projection on the frame $A'$. The slot $Y'$ allows the strap $W'$ to be raised or lowered, so as to raise and lower the sliding plate to adapt it to the length of the cord or chain $R^5$. By this means the table N can be swung to any desired position without interfering with or requiring any adjustment of the driving-pulleys and chain, as the plate $U'$ will slide up and down on its support, keeping the relative position of the pulleys the same, and consequently the chain or cord always taut and in working order.

The binding-wire $Q''$ is supported upon the spool $P''$, and passes therefrom over the anti-friction guide-pulley in the end of the bar Z; thence through a suitable opening in the point of the needle to the twister, where its end is held by being coiled around the shank, or in some other suitable manner.

The operation is similar to that of binders having this construction. The grain is dropped upon the stationary table K from the elevator, and swept across the table and upon the plate X and against the binding-wire by the rake-arm. The wire-arm descends, carries the wire around the bundle, where it is twisted together and severed, as before described. The rake-arm in the meantime rises and passes back again to sweep the next bundle into position for binding.

To prevent the wind from acting upon the grain while being swept across the table, a wind-board, B⁴, is hinged or pivoted to the table K in such a manner that it can be turned down and form a table for hand-binders. Another board, B⁵, is also provided, which can be secured to the other end of the table K, by which means the machine can be used for hand-binding in case the automatic binder becomes broken, the board B⁵ having the necessary shape, and being secured in such manner as to form the second table for a second hand-binder.

What I claim as new, and desire to secure by Letters Patent, is—

1. The rock-shaft E', provided with the elongated fulcrum $d$, in combination with the rake-arm F' and a suitable mechanism for operating the rake-arm, whereby the leverage of the arm is increased as it rises and its outer end given a greater elevation, substantially as and for the purpose specified.

2. The rock-shaft E', provided with the incline $c$, in combination with the rake-arm F', provided with the double-inclined projection $b$, and a suitable mechanism for operating the arm, for holding the arm down while sweeping across the grain-receiving table, substantially as and for the purpose specified.

3. The rock-shaft, incline $c$, and anti-friction roller $c^3$, in combination with the rake-arm F', double-inclined projection $b$, and a suitable mechanism for operating the rake-arm, substantially as and for the purpose specified.

4. The rock-shaft E', provided with the elongated fulcrum $d$ and incline $c$, in combination with the rake-arm F', provided with the double-inclined projection $b$, and a suitable mechanism for operating the arm, substantially as and for the purpose specified.

5. The rake-arm F', having the rake-tooth G', and provided with the double incline $b$, and spring-holder I' for holding the grain down while passing over the table, in combination with the rock-shaft E', provided with the incline $c$, stationary receiving-table K, and metal plate H', substantially as and for the purposes described.

6. The rake-arm F', having the rake-tooth G', and provided with the double incline $b$, tooth K', and spring-holder I', in combination with the rock-shaft E', having the incline $c$, stationary table K, plate H', and swinging table N for delivering the grain to the binding mechanism in proper condition for binding, substantially as specified.

7. The table N, plate P, and inclined socket Q, in combination with the support R and cross-bar S, whereby the socket serves the purpose of a pivot for the table and a bearing for the twisting-hook, substantially as specified.

8. The pivotal socket Q, forming a bearing for the twisting-hook, in combination with a swinging table and a twisting-hook, substantially as and for the purpose specified.

9. The shaft U and vibrating binder-arm V, in combination with the crank C'', rod or link D'', spring $w$, crank E'', shaft F'', and arm G'', all constructed and operating substantially as and for the purposes specified.

10. In combination with an automatic grain-binder, the disk A'', having a cut-away portion or depression, the lever $j$, rod $i$, rock-shaft $h$, rod $g$, the pedal $e$, and the binding mechanism, substantially as and for the purposes described.

11. The pinion N', provided with the shoulders or stops $u$, in combination with the sliding shaft O', provided with the pin $t$, the support Q', and a suitable mechanism for sliding the shaft and stopping the movement of the binding mechanism, substantially as and for the purpose specified.

12. The sliding shaft O', provided with the pin $t$, and pinion N', provided with the shoulders $u$, in combination with the pin $s$, head $q$, having the incline $r$, crank $p$, link $o$, bell-crank lever $j$ $k$, roller $m$, wheel A'', having a portion, $n$, cut away, and a mechanism for operating the bell-crank lever by the driver, substantially as and for the purpose set forth.

13. The sliding shaft O', provided with the pin $t$, and pinion N', provided with the shoulders $u$, in combination with the pin $s$, head $q$, having the incline $r$, crank $p$, rod $o$, bell-crank lever $j$ $k$, roller $m$, wheel A'', having the portion $n$ cut away, rod $i$, rock-shaft $h$, rod $g$, and treadle $e$, substantially as and for the purpose specified.

14. In combination with the driving mechanism of an automatic grain-binder, the driving chain or belt, the sliding plate U', carrying the pulley-wheels R'' R³, curved bar V', and connecting-bars W X' for taking up the slack of the chain or belt, substantially as specified.

15. The wire-spool P'', mounted on the spindle $y'$, in combination with the pivoted yielding lever S'' and the flexible backing or friction-pad O'' for relieving the spool from undue tension of the binding-wire, substantially as and for the purpose specified.

16. The pivoted lever S'', supporting the wire-spool P'', in combination with the friction-pad O'', coiled spring V'', cord U'', spool T'', and a tightening-nut, $x'$, for regulating the amount of yield of the lever, substantially as and for the purpose specified.

17. The flexible tension-pad O'', having fixed supports at its ends, in combination with the wire-spool P'', supported upon the yielding pivoted lever S'' for partly regulating the amount of tension on the binding-wire by the weight of the spool, substantially as and for the purpose specified.

18. The tension-pad O'', wire-spool P'', and pivoted lever S'', in combination with the coiled spring V'', cord U'', and spool T'', all constructed and operating substantially as and for the purposes specified.

19. The sliding cutter Z'', having the cutting-notch $r'$, opening $t'$, and projection $q'$, in combination with the segment F'', having projection $p'$, and with the roller $u'$, twisting-hook, and binder-arm V, substantially as specified.

20. The lever $A^3$, supporting the double-crank shaft $h$ for operating the mechanism disconnecting the sliding shaft $O'$ and pinion $N'$, in combination with the pedal $e$, whereby the clutch between the shaft $O'$ and pinion $N'$ can be operated by the pedal in whatever position the swinging table may be adjusted, substantially as and for the purpose specified.

21. The combination of the vibrating arm $G''$, the shaft $F''$ by which it is supported and moved, provided with the crank $E''$, a moved part of the machine, and the connecting-link, provided with a spring, so that its length may elastically yield, whereby said vibrating arm will oppose the needle and coact therewith as a compressor and move away to permit the escape of the bundle, substantially as described.

JOHN F. STEWARD.

Witnesses:
 HIRAM WHITNEY,
 P. F. HODGES.